(12) United States Patent
Pfister et al.

(10) Patent No.: US 11,142,041 B2
(45) Date of Patent: Oct. 12, 2021

(54) METHOD FOR OPERATING A FUEL-OPERATED VEHICLE HEATER

(71) Applicant: Eberspächer Climate Control Systems GmbH & Co. KG, Esslingen (DE)

(72) Inventors: Wolfgang Pfister, Esslingen (DE); Walter Blaschke, Deizisau (DE)

(73) Assignee: Eberspächer Climate Control Systems GmbH, Esslingen am Neckar (DE)

( * ) Notice: Subject to any disclaimer, the term of this patent is extended or adjusted under 35 U.S.C. 154(b) by 510 days.

(21) Appl. No.: 15/666,961

(22) Filed: Aug. 2, 2017

(65) Prior Publication Data
US 2018/0037088 A1 Feb. 8, 2018

(30) Foreign Application Priority Data

Aug. 3, 2016 (DE) ...................... 10 2016 114 315.4

(51) Int. Cl.
*B60H 1/22* (2006.01)
*F23N 5/14* (2006.01)
(Continued)

(52) U.S. Cl.
CPC ......... *B60H 1/2206* (2013.01); *B60H 1/2212* (2013.01); *F23D 3/40* (2013.01); *F23N 5/14* (2013.01); *F23Q 7/22* (2013.01); *B60H 2001/2234* (2013.01); *B60H 2001/2253* (2013.01); *B60H 2001/2271* (2013.01);
(Continued)

(58) Field of Classification Search
CPC ....................................................... F23Q 7/00
See application file for complete search history.

(56) References Cited

U.S. PATENT DOCUMENTS 4,391,237 A * 7/1983 Abe ...................... F02P 19/022
123/145 A
4,744,747 A * 5/1988 Kawamura .......... B60H 1/2206
123/551
(Continued)

FOREIGN PATENT DOCUMENTS

DE           199 36 729 C1    11/2000
DE     10 2004 025 772 A1    12/2005
(Continued)

*Primary Examiner* — Kenneth J Hansen
*Assistant Examiner* — John E Bargero
(74) *Attorney, Agent, or Firm* — McGlew and Tuttle, P.C.

(57) ABSTRACT

A method is provided for operating a fuel-operated vehicle heater (10) during a start phase of combustion operation. The heater includes a combustion air feed device (26) feeding air and a fuel feed device (22) feeding fuel (B) to a burner area (12) with a combustion chamber (16). An electrically energizable ignition element (32) ignites a fuel/air mixture formed. The method includes energizing the ignition element (32) in a preheating phase prior to the fuel feed, at a time of entry into an ignition phase, detecting electrical resistance of the ignition element (32) and determining a desired resistance based on the electrical resistance of the ignition element (32) detected and operating the ignition element (32) in a resistance-regulating operating mode during the ignition phase such that an actual resistance of the ignition element (32) is in the range of the determined desired resistance of the ignition element (32).

18 Claims, 2 Drawing Sheets

(51) Int. Cl.
*F23D 3/40* (2006.01)
*F23Q 7/22* (2006.01)

(52) U.S. Cl.
CPC ...... *F23N 2227/02* (2020.01); *F23N 2227/28* (2020.01); *F23N 2227/38* (2020.01); *F23N 2227/42* (2020.01); *F23N 2241/14* (2020.01)

(56) References Cited

U.S. PATENT DOCUMENTS

| | | | | |
|---|---|---|---|---|
| 5,195,886 A * | 3/1993 | Ida | ............ | F23N 5/203 |
| | | | | 126/110 C |
| 5,632,443 A * | 5/1997 | Quarrie | ............ | B60H 1/2209 |
| | | | | 237/12.3 C |
| 8,423,197 B2 * | 4/2013 | Sakurai | ............ | F02P 19/027 |
| | | | | 700/296 |
| 9,134,180 B2 * | 9/2015 | James | ............ | G01J 5/0014 |
| 10,132,288 B2 * | 11/2018 | Joos | ............ | F02P 19/025 |
| 2002/0036192 A1 * | 3/2002 | Sato | ............ | F02P 17/12 |
| | | | | 219/270 |
| 2006/0289457 A1 * | 12/2006 | Baecker | ............ | F23N 5/143 |
| | | | | 219/497 |
| 2014/0054279 A1 * | 2/2014 | Joos | ............ | F02P 19/025 |
| | | | | 219/264 |

FOREIGN PATENT DOCUMENTS

| | | |
|---|---|---|
| DE | 10 2005 004 359 A1 | 8/2006 |
| EP | 1 493 969 A2 | 1/2005 |
| WO | 2004/082971 A1 | 9/2004 |

* cited by examiner

METHOD FOR OPERATING A FUEL-OPERATED VEHICLE HEATER

CROSS REFERENCE TO RELATED APPLICATIONS

This application claims the benefit of priority under 35 U.S.C. § 119 of German Application DE 10 2016 114 315.4 filed Aug. 3, 2016, the entire contents of which are incorporated herein by reference.

FIELD OF THE INVENTION

The present invention pertains to a method for operating a fuel-operated vehicle heater during a start phase of the combustion operation. Such a vehicle heater has, in general, a burner area, in which a combustion chamber is formed. Fuel is fed by a fuel feed device into the burner area or the combustion chamber thereof. The air necessary for forming an ignitable or combustible mixture of air and fuel is fed into the burner area or the combustion chamber thereof by a combustion air feed device.

BACKGROUND OF THE INVENTION

DE 10 2005 004 359 A1 discloses a vehicle heater with a burner area, whose pot-shaped combustion chamber housing defines a combustion chamber with a circumferential wall and a bottom area. The bottom area is covered by a porous evaporator medium. Liquid fuel is fed into the porous evaporator medium by means of a fuel feed device via a fuel line opening into the bottom area. The air necessary for the combustion is introduced into the combustion chamber by means of a combustion air feed device through openings provided in the circumferential wall. An ignition element provided for starting the combustion, i.e., for igniting a fuel/air mixture, is carried on the circumferential wall and it extends at a short distance from the porous evaporator medium starting from the circumferential wall into the combustion chamber.

DE 10 2004 025 772 A1 discloses a method for operating such a fuel-operated vehicle heater in a start phase of the combustion operation. A desired output is preset during this start phase for the output, i.e., also the electric output corresponding to the heat output, and the ignition element is operated in an output regulation operating mode, so that an actual output is in the range of the desired output. With the generation of the start command, i.e., of a command prompting the putting into operation of the vehicle heater, the desired output is set at first at a somewhat lower value, which guarantees that the electrical current flowing through the ignition element cannot exceed a limit value. After the end of a predefined duration, the desired output is increased in order to achieve the most rapid heating possible of the ignition element to its desired operating temperature at a correspondingly higher output or heat output. The heat output is then reduced again, i.e., a somewhat lower desired output is preset, which shall guarantee that the ignition element will remain in an essentially stationary temperature state in the range of its desired operating temperature even during stationary combustion and hence when heat is introduced into the ignition element by the flame.

SUMMARY OF THE INVENTION

An object of the present invention is to provide a method for operating a fuel-operated vehicle heater, which guarantees efficient operation of an ignition element to be energized for starting the combustion with reduced risk of thermal overload on the ignition element.

This object is accomplished according to the present invention by a method for operating a fuel-operated vehicle heater during a start phase of the combustion operation, wherein the vehicle heater has a burner area with a combustion chamber, a fuel feed device for feeding fuel to the burner area, a combustion air feed device for feeding combustion air to the burner area as well as at least one electrically energizable ignition element for igniting a fuel/air mixture formed in the combustion chamber, the method comprising the following actions: a) Energization of the ignition element in a preheating phase prior to the beginning of the fuel feed, b) detection, on entry into an ignition phase, of the electrical resistance of the ignition element and determination of a desired resistance on the basis of the electrical resistance of the ignition element, which was detected at the time of entry into the ignition phase, and c) operation of the ignition element in the ignition phase in a resistance regulation mode such that an actual resistance of the ignition element is in the range of the desired resistance of the ignition element determined during action b).

In the method according to the present invention, the ignition element is first brought in the direction of an operating temperature desired for the ignition process as rapidly as possible by operating the ignition element during a preheating phase prior to the entry into the ignition phase. With the entry into the ignition phase, i.e., at a time at which the ignition of the mixture present or to be formed in a combustion chamber is to be expected or imminent, the electrical resistance of the ignition element is first determined, and the operation is passed over, for example, simultaneously or with a time delay, into an operating mode that guarantees that the electrical resistance of the ignition element remains in the range of the desired resistance. Since the electrical resistance of the ignition element is unambiguously linked with the temperature of the ignition element, it is thus guaranteed that the temperature of the ignition element also remains in the range of a temperature associated with the desired resistance. A combustion starting in the combustion chamber, which leads to an additional introduction of heat into the ignition element, is automatically taken into account in the procedure according to the present invention such that when the temperature of the ignition element can be maintained at a constant value or would, in principle, increase during the performance of the resistance regulation due to such an introduction of energy from the outside, the electrical output, i.e., the heat output of the ignition element, is correspondingly reduced, so that the temperature of the ignition element can be maintained at an essentially constant value.

It thus becomes possible to bring the ignition element during the preheating phase as close as possible to the temperature desired for the ignition process, which may be only slightly below the temperature that is the maximum allowable temperature for such an ignition element, because a further heating of the ignition element at the time of transition into the resistance regulation operating mode is ruled out even in case of an incipient combustion. The ignition element can consequently be operated in the ignition phase close to its output maximum, without the risk of a thermal overload being present.

Provisions may further be made in the method according to the present invention for the fuel feed device to be activated on entry into the ignition phase for the delivery of fuel to the burner area. Consequently, the entry into the ignition phase is tantamount to the start of the delivery operation of the fuel feed device in this procedure.

In an alternative procedure, the fuel feed device may be activated for the delivery of fuel to the burner area at a predefined time prior to the entry into the ignition phase. This means in the sense of the present invention that the fuel feed device is first activated in order to deliver fuel and the process changes over into the resistance regulation operating mode of the ignition element only with a time delay thereafter. This time delay or the duration by which the fuel feed device is activated prior to the changeover into the resistance regulation operating mode should be selected to be such that it is guaranteed that combustion will not have been essentially started in the combustion chamber at the time of transition into the resistance regulation operating mode and hence also at the time when the desired resistance is set.

Provisions may be made in another alternative procedure for the fuel feed device to be activated for the delivery of fuel to the burner area a predefined time period after the entry into the ignition phase. This means that the operation first changes over into the resistance regulation operating mode and the fuel feed device is put into operation for delivering fuel into the combustion chamber of a burner area only thereafter, i.e., with a time delay in relation thereto. It can thus be ensured that combustion cannot, indeed, have been started yet.

It should be noted that the time at which the electrical resistance of the ignition element is determined and which can be considered, for example, to be the time on entry into the ignition phase, can be considered to be the reference for the start of fuel delivery. As was explained above, it is possible to change over to the resistance regulation operating mode simultaneously with this detection or with a time delay thereafter during the ignition phase. This transition into the resistance regulation operating mode may also be used as a reference for the start of the fuel delivery if fuel delivery takes place with a time delay in relation to the detection of the electrical resistance, so that the fuel delivery can start simultaneously with the entry into the resistance regulation operating mode, at a predetermined time before entry into the resistance regulation operating mode or at a predefined time after entry into the resistance regulation operating mode.

To make it possible to bring the ignition element in the direction of the temperature desired for the ignition operation as rapidly as possible prior to the ignition phase, it is proposed that the ignition element be operated in action a) in the preheating phase in an output regulation operating mode.

At least one desired output may be predefined for the ignition element for the preheating phase, for example, in action a), and the ignition element is operated in the preheating phase such that an actual output is in the range of the desired output.

According to an especially advantageous aspect of the method according to the present invention, provisions may further be made for the actual output of the ignition element to be compared with a reference output in the ignition phase and for a combustion to be detected in the combustion chamber when the actual output is in the range of the reference output or drops below the reference output. If a flame develops in the combustion chamber and combustion thus develops, heat of combustion is introduced into the ignition element. Since the ignition element is maintained at an essentially constant temperature by the resistance regulation, the heat output of the ignition element is reduced corresponding to this introduction of external energy. The reduction of the heat output or of the electrical output of the ignition element can be observed in order to make it possible to infer by a comparison with a reference predefine therefor that the combustion was indeed started in the combustion chamber. This may be used, for example, as the reason for ending the energization of the ignition element, because the introduction of a sufficient amount of external energy into the ignition element indicates that the flame or the combustion has become stable in the combustion chamber and a further operation of the ignition element is not therefore necessary.

The present invention further pertains to a fuel-operated vehicle heater, comprising a burner area with a combustion chamber, a fuel feed device for feeding fuel to the burner area, a combustion air feed device for feeding combustion air to the burner area, as well as at least one electrically energizable ignition element for igniting a fuel/air mixture formed in the combustion chamber, further comprising an actuating device for actuating the ignition element, the fuel feed device and the combustion air feed device, wherein the actuating device is configured for carrying out a method according to the present invention.

The burner area may comprise a pot-shaped combustion chamber housing with a bottom area covered by a porous evaporator medium in at least some areas and with a circumferential wall, wherein the ignition element is carried on the circumferential wall and extends at a spaced location from the porous evaporator medium into the combustion chamber, preferably essentially parallel to a side of the porous evaporator medium facing the combustion chamber.

Since only a comparatively small percentage of the thermal energies provided by the ignition element is indeed introduced into the porous evaporator medium in such a configuration of a burner area and, on the one hand, the evaporation of fuel from this evaporator medium is supported by only a comparatively small percentage of these energies and, on the other hand, such energies contribute to the creation of ignition conditions in this area as well, it is especially advantageous to make it possible to operate the ignition element with the use of the method according to the present invention very close to its maximum allowable operating temperature and thus to make it possible to introduce a sufficient amount of energy into the combustion chamber for starting the combustion in a comparatively short time.

The present invention will be described in detail below with reference to the attached figures.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
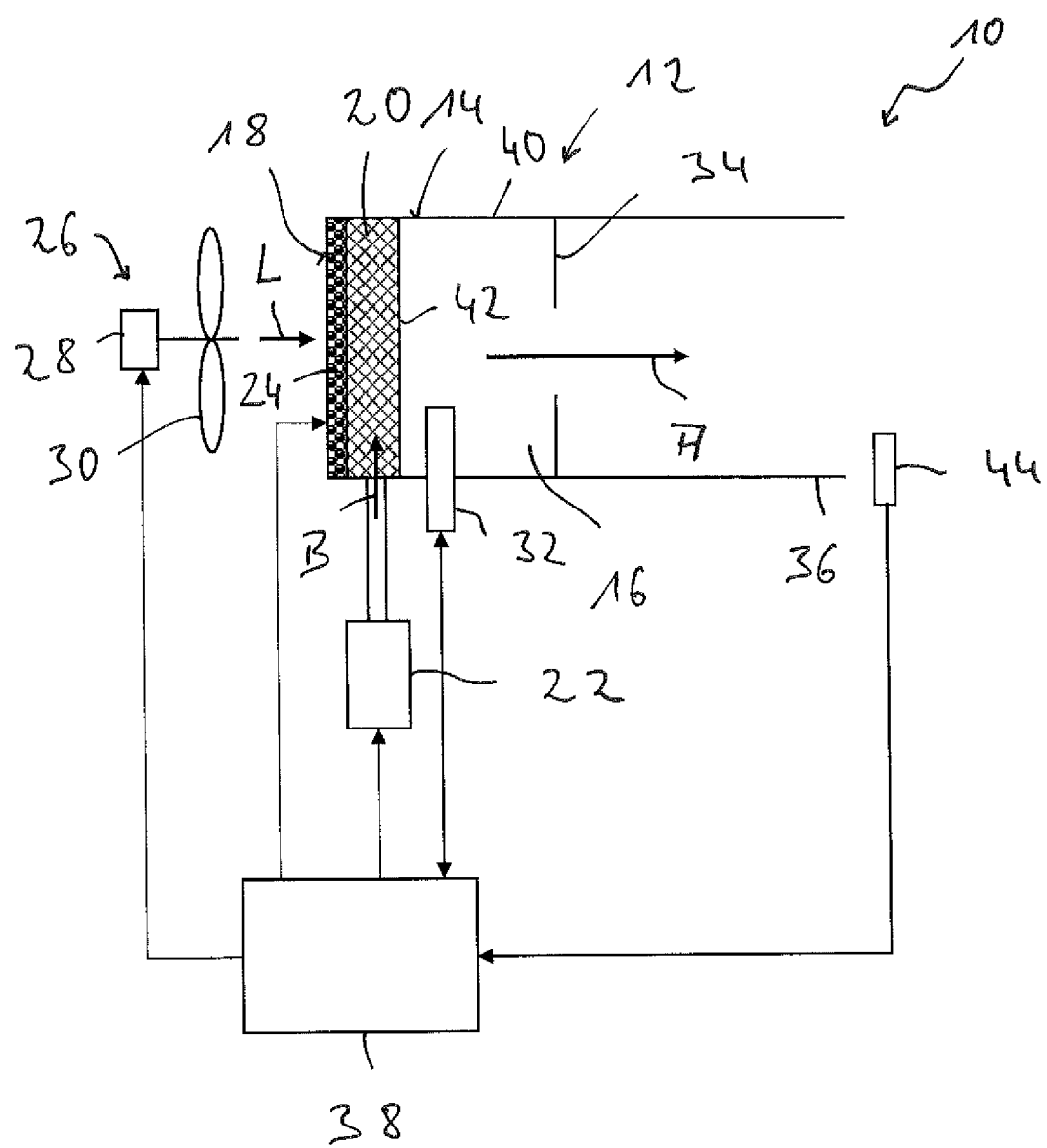
FIG. 1 is a schematic view of a fuel-operated vehicle heater.

Referring to the drawings, a fuel-operated heater, which can be used, for example, as a parking heater or/and as an auxiliary heater in a vehicle is generally designated by 10 in FIG. 1. The vehicle heater 10 comprises a burner area 12 with a combustion chamber housing 14, in which a combustion chamber 16 is formed. A porous evaporator medium 20, into which liquid fuel B is fed from a fuel tank, not shown, by a fuel feed device 22, for example, a feed pump, is provided, for example, at a bottom area 18 of the combustion chamber housing 14. An electrically energizable heating device 24, which can be operated especially during the start phase to support the evaporation of fuel B from the porous evaporator medium 20 in the direction of the combustion chamber 16, may be provided on the rear side of the porous evaporator medium 20 facing away from the combustion chamber.

A combustion air feed device, generally designated by 26, for example, a side channel blower, is provided for providing the mixture to be burned in the combustion chamber 16, which mixture consists of fuel B and combustion air L. The combustion air feed device 26 comprises a blower motor 28 and a delivery wheel 30 delivering the combustion air L in the direction of the combustion chamber 16.

To ignite the mixture formed during the operation of the fuel feed device 22 and the combustion air feed device 26 in the combustion chamber 16, an ignition element 32, for example, a glow-type ignition pin, is provided. This is operated by electrical energization especially during the start phase in order to create ignition conditions locally, i.e., in the area surrounding the ignition element 32. The combustion waste gases A generated during the combustion in the combustion chamber 16 leave the combustion chamber 16 in the area of a flame diaphragm 34 and enter a flame tube 36. This is open in its end area facing away from the combustion chamber 16, so that the hot combustion waste gases A cannot interact thermally with a heat exchanger unit, not shown in FIG. 1. While flowing out of the heat exchanger unit, the combustion waste gases A may flow around a flame sensor 44, which is configured, for example, as a temperature sensor and which delivers an output signal, which reflects the temperature of the waste gas stream and thus makes it possible to infer the state of combustion.

The fuel feed device 22, the combustion air feed device 26 and the ignition element 32 are actuated by an actuating device 38. This controls or regulates the operation of these system areas during the start phase and during the normal combustion operation by generating corresponding actuating signals or by applying operating voltages necessary for the operation of these system areas. In particular, the ignition element 32 may be actuated such that an energizing voltage, which is timed with a duty factor and is generated on the basis of a vehicle system voltage, is applied to it. The mean or effective voltage and hence also the electrical output provided on application of such a voltage or the heat output of the ignition element 32 are varied by varying the duty factor. The electrical output and the heat output can be determined now on the basis of the mean or effective voltage and of the electrical current flowing in the process through the ignition element 32. The electrical resistance of said ignition element, which depends on the temperature of the ignition element 32, can likewise be determined on the basis of the mean or effective voltage and of the electrical current flowing through the ignition element 32.

Figure 2:
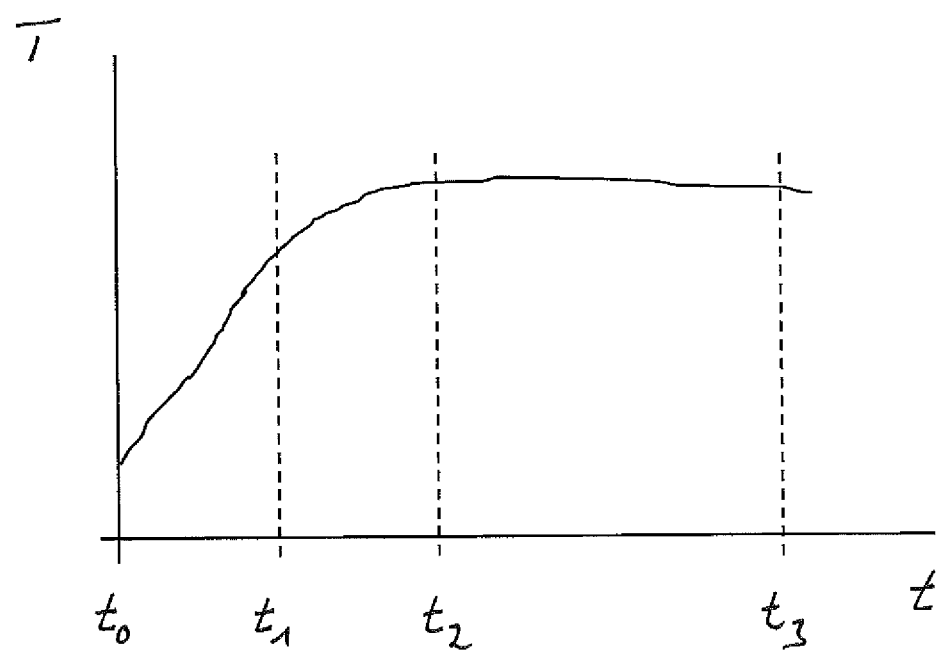
FIG. 2 is a diagram showing the temperature T in the area of an ignition element as a function of time t.

The operation of the vehicle heater 10 will be described below with reference to FIG. 2. FIG. 2 shows, plotted over the time t, the changes in the temperature T of the ignition element 32 during the start phase of the combustion operation of the vehicle heater 10. Since the ignition element 32 comprises, in general, one or more resistance wires with ohmic resistance characteristics, the curve describing the temperature T in FIG. 2 also reflects the curve of the electrical resistance of the ignition element 32.

It shall be assumed that a start command for putting the vehicle heater 10 into operation is generated at a time $t_0$. With the generation of this start command or with a predefined delay in relation to it, the ignition element 32 is operated preferably in an output-regulating operating mode during a preheating phase or pre-glow phase. It is possible to operate for this, for example, for the most rapid heating possible of the ignition element 32 with a comparatively high desired output in the range of about 115 W to 120 W up to a time $t_1$. Starting from the time $t_1$, it is possible to operate with a somewhat lower output in the range of about 110 W in order to prevent the temperature of the ignition element 32 from exceeding the maximum allowable operating temperature of said ignition element. This temperature may be, for example, in a range of 1,300° C. to 1,350° C.

The preheating phase, i.e., the duration until a time $t_2$, may take place over a duration predefined as a fixed duration with a fixed, predefined desired output, which possibly also varies depending on the ambient temperature or other influencing variables. The combustion air feed device 26 may already be put into operation in the course of this preheating phase. It can be assumed at the end of the preheating phase that a sufficiently high temperature, which guarantees the ignition of a mixture of combustion air L and fuel B, which mixture is yet to be generated, is present in the area surrounding the ignition element 32 due to sufficient heating of said ignition element 32.

An ignition phase can start at the time $t_2$; the start of this ignition phase may be defined by the electrical resistance of the ignition element 32 being determined and by changing over to a resistance-regulating operating mode immediately at the time of determination of this resistance or possibly with a predefined time delay at the ignition element 32, for example, from the output-regulating operating mode. The electrical resistance of the ignition element 32, which is to be used as the desired resistance for this resistance-regulating operating mode, can be set on the basis of the electrical resistance present at the time $t_2$, which can in turn be determined on the basis of the voltage or effective voltage present on the ignition element 32 and of the electrical current flowing through the ignition element 32. For example, the desired resistance may correspond to this electrical resistance of the ignition element 32, which is determined at the time $t_2$.

Beginning from the time $t_2$, the electrical resistance and hence also the temperature of the ignition element 32 is maintained at a value corresponding to the desired resistance by the resistance regulation now taking place. Since it can be ensured by the output regulation taking place during the preheating phase that the ignition element 32 is brought to a temperature close to its maximum allowable operating temperature, the temperature of the ignition element 32 is maintained in a range close to but below the maximum allowable temperature or temperature desired for the ignition process during the ignition phase, i.e., starting from the time $t_2$ as well.

The fuel feed device 22 can be activated, for example, simultaneously with the entry into the ignition phase, i.e., at time $t_2$, in order thus to also start the introduction of fuel B into the combustion chamber 16 simultaneously with the start of the resistance regulation of the ignition element 32. It is thus guaranteed that fuel vapor, which will mix with the combustion air L present in the combustion chamber 16 and will be ignited by the ignition element 32, is discharged into the combustion chamber 16 shortly after the onset of the ignition phase due to fuel B being provided in the porous evaporator medium 20.

In an alternative procedure, the feeding of fuel B into the porous evaporator medium 20 or into the chamber 16 may be started already before the transition to the resistance-regulating operating mode by activating the fuel feed device 22. Provisions may, for example, be made for the fuel feed to be started a predefined duration after generation of the start command, i.e., after the time $t_0$, and for changing over into the resistance-regulating operating mode, i.e., for entering the ignition phase after an additional predefined duration after the start of the feed of fuel. This additional predefined duration is preferably to be selected such that it will not have essentially started by the time of entry into the ignition phase and the desired resistance can thus be determined and fixed in a state in which the introduction of external energy into the ignition element 32 is essentially not yet taking place.

In another alternative procedure, the fuel feed device 22 may be activated after a predefined duration after the resistance-regulating operating mode has been started in order to thus guarantee that the temperature of the ignition element 32 will have stabilized by the time at which the feed of fuel into the combustion chamber 16 actually begins.

The mixture of fuel B and combustion air L, which mixture is present in the combustion chamber 16, is ignited during the ignition phase, so that the combustion begins in the combustion chamber 16. Heat is provided by this combustion and is also introduced into the ignition element 32. If the heat output of the ignition element 32 remains unchanged, this would lead to an additional heating of the ignition element 32, with the risk that this could exceed its maximum allowable operating temperature. However, since resistance regulation and hence also a temperature regulation of the ignition element 32 take place according to the present invention, the heat output of the ignition element 32 is reduced with increasing introduction of external energy into the ignition element 32 in order thus to maintain the temperature and hence the electrical resistance at essentially constant values.

If the electrical output of the ignition element 32 is observed in the course of the ignition phase, it can be seen by comparison with a reference output when a sufficiently intense combustion is present in the combustion chamber 16 and when the combustion has stabilized such that a substantial reduction of the heat output of the ignition element 32 is necessary in order to avoid a rise in temperature. For example, an output determined on the basis of the electrical output of the ignition element 32, which is present at the time of entry into the ignition phase, i.e., at the time $t_2$, can be used as a reference output. For example, the reference output could be determined as a certain percentage, for example, 50%, of the output present at the time $t_2$. If the heat output drops below this value, this can be used as an indicator of a sufficiently stable combustion and the energization of the ignition element 32 can correspondingly be terminated, e.g., at a time $t_3$. The change over time, i.e., the time gradient of the output of the ignition element 32, could also be observed, and the onset of combustion could be inferred when this gradient exceeds a certain reference, i.e., when a great decrease is observed in the output. The observation of the output of the ignition element 32 can assume the functionality of the flame sensor 44 at least during this phase. Since the ignition element 32 detects and provides this information directly in a range in which the combustion takes place, it is possible to respond to the onset of combustion substantially more rapidly; for example, the energization of the ignition element 32 can be stopped and the energization of the heating device 24, which is also activated during the start phase to support the evaporation of the fuel, can also be ended.

The above-described procedure can be used especially advantageously if the ignition element 32, as is shown in FIG. 1, extends, beginning from the circumferential wall 40, essentially parallel to the side 42 of the porous evaporator medium 20 facing the combustion chamber 16. Since only a small part of the energy emitted by the ignition element 32 can actually be utilized in case of this arrangement of the ignition element 32 to create conditions for an ignition and to ignite the fuel/air mixture, it is advantageous for achieving the shortest possible duration of the start phase and also possible with the procedure according to the present invention to operate the ignition element 32 close to its maximum allowable operating temperature, without the risk of overheating being present, even though the ignition element 32 will be, while combustion is taking place, directly in the range in which very high combustion temperatures will occur. The procedure according to the present invention may likewise be used in a vehicle heater in which the ignition element is mounted in a tubular attachment, which extends away from the circumferential wall and in which it is not directly exposed to the high combustion temperatures. It also advantageous in case of such a configuration as well to be able to bring the ignition element to a very high temperature as rapidly as possible with the use of the method according to the present invention and to maintain it at this temperature in a stable manner. The procedure according to the present invention may also be employed in a fuel-operated vehicle heater that has a plurality of ignition elements, which can be activated, for example, simultaneously in order to start the combustion in a combustion chamber.

While specific embodiments of the invention have been shown and described in detail to illustrate the application of the principles of the invention, it will be understood that the invention may be embodied otherwise without departing from such principles.

What is claimed is:

1. A method for operating a fuel-operated vehicle heater during a start phase of a combustion operation, wherein the vehicle heater comprises a burner area with a combustion chamber, a fuel feed device for feeding fuel to the burner area, a combustion air feed device for feeding combustion air to the burner area, as well as at least one electrically energizable ignition element for igniting a fuel/air mixture formed in the combustion chamber, the method comprising the steps of: energizing the ignition element in a preheating phase, prior to the beginning of a fuel feed, wherein said step of energizing the ignition element comprises operating the ignition element in the preheating phase in an output-regulating operating mode by controlling an electrical output of the electrically energizable ignition element such as to be in a range of a desired electrical output; upon entering into an ignition phase from the preheating phase prior to a start of the combustion in the combustion chamber, determining an electrical resistance of the ignition element at a time of entry into the ignition phase; and operating the ignition element in a resistance-regulating operating mode during the ignition phase by controlling the electrical resistance of the electrically energizable ignition element such that the electrical resistance of the ignition element is in a range of a desired electrical resistance, the desired electrical resistance being the electrical resistance determined at the time of entry into the ignition phase.

2. The method in accordance with claim 1, wherein the fuel feed device is activated at the time of entry into the ignition phase for feeding fuel to the burner area.

3. The method in accordance with claim 1, wherein the fuel feed device is activated at a predefined duration before the entry into the ignition phase for feeding fuel to the burner area.

4. The method in accordance with claim 1, wherein the fuel feed device is activated a predefined duration after the entry into the ignition phase for feeding fuel to the burner area.

5. The method in accordance with claim 1, further comprising comparing an actual output of the ignition element with a reference output in the ignition phase and when the actual output is in the range of the reference range or drops below the reference range, combustion is detected in the combustion chamber.

6. The method in accordance with claim 5, wherein the energization of the ignition element is ended when combustion is detected in the combustion chamber.

7. A fuel-operated vehicle heater, comprising:
a burner area with a combustion chamber;
a fuel feed device for feeding fuel to the burner area;
a combustion air feed device for feeding combustion air to the burner area;
an electrically energizable ignition element for igniting a fuel/air mixture formed in the combustion chamber;
an actuating device for actuating the ignition element, for actuating the fuel feed device and for actuating the combustion air feed device, wherein the actuating device is configured to:
energize the ignition element in a preheating phase in an output-regulating operating mode by controlling an electrical output of the electrically energizable ignition element such as to be in a range of a desired electrical output;
upon entering into an ignition phase from the preheating phase prior to a start of the combustion in the combustion chamber, determine an electrical resistance of the ignition element at a time of entry into the ignition phase; and
operate the ignition element in a resistance-regulating operating mode during the ignition phase by controlling the electrical resistance of the electrically energizable ignition element such that the electrical resistance of the ignition element is in a range of a desired electrical resistance, the desired electrical resistance being the electrical resistance determined at the time of entry into the ignition phase.

8. The fuel-operated vehicle heater in accordance with claim 7, wherein the burner area comprises:
a pot-shaped combustion chamber housing with a bottom area;
a porous evaporator medium covering the bottom area in at least some areas; and
a circumferential wall, wherein the ignition element is carried on the circumferential wall and extends at a spaced location from the porous evaporator medium into the combustion chamber essentially parallel to a side of the porous evaporator medium facing the combustion chamber.

9. The fuel-operated vehicle heater in accordance with claim 8, wherein the fuel feed device is activated at the time of entry into the ignition phase for feeding fuel to the burner area.

10. The fuel-operated vehicle heater in accordance with claim 8, wherein the fuel feed device is activated at a predefined duration before the entry into the ignition phase for feeding fuel to the burner area.

11. The fuel-operated vehicle heater in accordance with claim 8, wherein the fuel feed device is activated a predefined duration after the entry into the ignition phase for feeding fuel to the burner area.

12. The fuel-operated vehicle heater in accordance with claim 8, wherein the actuating device is further configured to compare an actual output of the ignition element with a reference output in the ignition phase and when the actual output is in the range of the reference range or drops below the reference range, combustion is detected in the combustion chamber.

13. The fuel-operated vehicle heater in accordance with claim 12, wherein the energization of the ignition element is ended when combustion is detected in the combustion chamber.

14. A fuel-operated vehicle heater, comprising: a burner area comprising a combustion chamber; a fuel feed device for feeding fuel to the burner area; a combustion air feed device for feeding combustion aft to the burner area; an electrically energizable ignition element for igniting a fuel/air mixture formed in the combustion chamber; an actuating device for actuating the ignition element for actuating the fuel feed device and for actuating the combustion aft feed device, wherein the actuating device is configured to: energize the ignition element in a preheating phase in an output-regulating operating mode by controlling an electrical output of the electrically energizable ignition element such as to be in a range of a desired electrical output; determine an electrical resistance of the ignition element at a time of entry into an ignition phase upon a transition from the preheating phase to an ignition phase; and operate the ignition element in a resistance-regulating operating mode during the ignition phase by controlling the electrical resistance of the electrically energizable ignition element such that the electrical resistance of the ignition element is in a range of a desired electrical resistance, the desired electrical resistance being the electrical resistance determined at the time of entry into the ignition phase.

15. The fuel-operated vehicle heater in accordance with claim 14, wherein the electrical resistance of the ignition element is detected and the desired resistance is determined prior to starting combustion in the combustion chamber.

16. The fuel-operated vehicle heater in accordance with claim 15, wherein the resistance-regulating operating mode is started prior to starting combustion in the combustion chamber.

17. The method in accordance with claim 1, wherein at least a portion of the ignition element is arranged in the combustion chamber of the fuel-operated vehicle heater, wherein the time of entry into the ignition phase corresponds to a time at which ignition of the fuel/air mixture present or to be formed in the combustion chamber is expected to occur.

18. The fuel-operated vehicle heater in accordance with claim 7, wherein at least a portion of the ignition element is arranged in the combustion chamber of the fuel-operated vehicle heater, wherein the time of entry into the ignition phase corresponds to a time at which ignition of the fuel/air mixture present or to be formed in the combustion chamber is expected to occur.

* * * * *